United States Patent

Daly et al.

(10) Patent No.: US 7,610,738 B2
(45) Date of Patent: Nov. 3, 2009

(54) GREENS MOWER DATA DISPLAY AND CONTROLLER

(75) Inventors: J. Shawn Daly, Fort Mill, SC (US); Carlos A. Bellot, Charlotte, NC (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 12/099,490

(22) Filed: Apr. 8, 2008

(65) Prior Publication Data

US 2008/0184688 A1 Aug. 7, 2008

Related U.S. Application Data

(63) Continuation of application No. 11/071,049, filed on Mar. 2, 2005, now Pat. No. 7,367,173.

(51) Int. Cl.
*A01D 41/14* (2006.01)
*A01D 41/127* (2006.01)
*A01D 46/08* (2006.01)

(52) U.S. Cl. .................. 56/10.2 R; 701/22; 701/36

(58) Field of Classification Search .......... 701/22, 701/36; 322/27, 28; 56/10.2 A, 10.2 R, 10.2 H, 56/11.9
See application file for complete search history.

(56) References Cited

U.S. PATENT DOCUMENTS

| | | | | |
|---|---|---|---|---|
| 4,995,227 A | * | 2/1991 | Foster | 56/249 |
| 5,388,176 A | * | 2/1995 | Dykstra et al. | 388/811 |
| 5,394,678 A | | 3/1995 | Lonn et al. | |
| 5,406,778 A | | 4/1995 | Lamb et al. | |
| 5,442,901 A | * | 8/1995 | Niemela et al. | 56/11.9 |
| 5,490,370 A | * | 2/1996 | McNair et al. | 56/11.9 |
| 5,497,604 A | | 3/1996 | Lonn | |
| 5,606,851 A | * | 3/1997 | Bruener et al. | 56/11.9 |
| 5,937,622 A | * | 8/1999 | Carrier et al. | 56/11.9 |
| 6,339,916 B1 | | 1/2002 | Benson | |
| 6,523,334 B1 | * | 2/2003 | Dettmann | 56/11.9 |
| 6,531,850 B1 | * | 3/2003 | Griffin et al. | 322/28 |
| 6,622,464 B2 | | 9/2003 | Goman et al. | |
| 6,758,030 B2 | * | 7/2004 | Dettmann | 56/11.9 |
| 7,007,446 B2 | * | 3/2006 | Dettmann | 56/11.9 |
| 7,111,443 B2 | | 9/2006 | Anderson et al. | |

(Continued)

FOREIGN PATENT DOCUMENTS

EP 1 452 084 A2 9/2004

(Continued)

*Primary Examiner*—Árpád Fábián-Kovács
(74) *Attorney, Agent, or Firm*—Harness, Dickey & Pierce, P.L.C.

(57) ABSTRACT

A turf maintenance vehicle, wherein the vehicle includes a traction drive system structured and operable to provide movement of the vehicle across a ground surface, and an electric motor structured and operable to provide rotation of a cutting device that includes a plurality of cutting blades. The vehicle additionally includes a vehicle controller that is configured to receive a programmable vehicle clip rate data input and monitor a groundspeed of the vehicle and a rotational speed of the cutting device as the vehicle moves across the ground surface. The controller is additionally configured to actively control the electric motor based on the monitored vehicle groundspeed to thereby actively control the rotational speed of the cutting device in order to maintain the programmed clip rate of the vehicle as the vehicle moves across the ground surface.

30 Claims, 2 Drawing Sheets

U.S. PATENT DOCUMENTS

2003/0061792 A1    4/2003  Fillman et al.
2004/0163373 A1    8/2004  Adams et al.
2005/0072132 A1*   4/2005  Dettmann .................. 56/10.8
2006/0096266 A1*   5/2006  Dettmann .................. 56/11.9

FOREIGN PATENT DOCUMENTS

EP          1 495 661  A1     1/2005

* cited by examiner

GREENS MOWER DATA DISPLAY AND CONTROLLER

CROSS-REFERENCE TO RELATED APPLICATIONS

This application is a continuation of U.S. patent application Ser. No. 11/071,049 filed on Mar. 2, 2005 (now U.S. Pat. No. 7,367,173). The disclosure of the above application is incorporated herein by reference in its entirety.

FIELD

The present disclosure relates to greens mowers and, more particularly, relates to a greens mower data display and control system for improved cutting performance and operation.

BACKGROUND

As is known in the prior art, greens mowers are particularly useful in mowing golf course greens, which are known to require exacting mowing results to assure that the grass is cut consistently throughout the green. Traditionally, these greens mowers are either walk-behind type mowers or riding mowers.

Greens mowers generally employ a reel type mowing unit as opposed to a rotary type mowing unit. The clip rate of these reel type mowing units are of utmost concern due to the fact that the clip rate often determines the consistency and quality of the cut, which leads to improved turf health. Because of the time required to grow a mature green and the cost associated with therewith, it is extremely important that greens mowers operate properly and not damage the turf.

The term clip rate is generally understood to mean the ratio between the rotational speed of the reel and the corresponding speed of the traction or drive unit. The clip rate can often be measured by the distance between the locations of individual sequential grass cuts produced by the rotating reel blades successively moving over the grass. The grass between the locations of the cuts will necessarily be left taller than the cut grass at the cut locations. Consequently, the cut rate is vital to producing an optimum condition of the grass on the golf course green.

In light of this need for optimum cutting performance, it is desirable that greens mowers include electrical circuitry which precludes mower overloads and consequent mower damage, gives the operator current information on the quantity of the battery charge, automatically and manually shuts off under both desirable and undesirable conditions, automatically shuts off the electric power by a predetermined time after the mower has been used for mowing.

Additionally, it should be recognized that many golf courses are serviced by a fleet of mowers. Ideally, these mowers will provide identical cutting results in their respective mowing roles. However, as can be appreciated for instance in greens mowers, one operator may operate his mowers at a different groundspeed or clip rate than others, thereby resulting in differing cutting results.

SUMMARY

According to various principles of the present disclosure, a turf maintenance vehicle is provided. In various embodiments, the vehicle includes a traction drive system structured and operable to provide movement of the vehicle across a ground surface, and an electric motor structured and operable to provide rotation of a cutting device that includes a plurality of cutting blades. The vehicle additionally includes a vehicle controller that is configured to receive a programmable vehicle clip rate data input and monitor a groundspeed of the vehicle and a rotational speed of the cutting device as the vehicle moves across the ground surface. The controller is additionally configured to actively control the electric motor based on the monitored vehicle groundspeed to thereby actively control the rotational speed of the cutting device in order to maintain the programmed clip rate of the vehicle as the vehicle moves across the ground surface.

Further areas of applicability of the present disclosure will become apparent from the detailed description provided hereinafter. It should be understood that the detailed description and specific examples, while indicating the various embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description of various embodiments is merely exemplary in nature and is in no way intended to limit the disclosure, its application, or uses.

Figure 1:
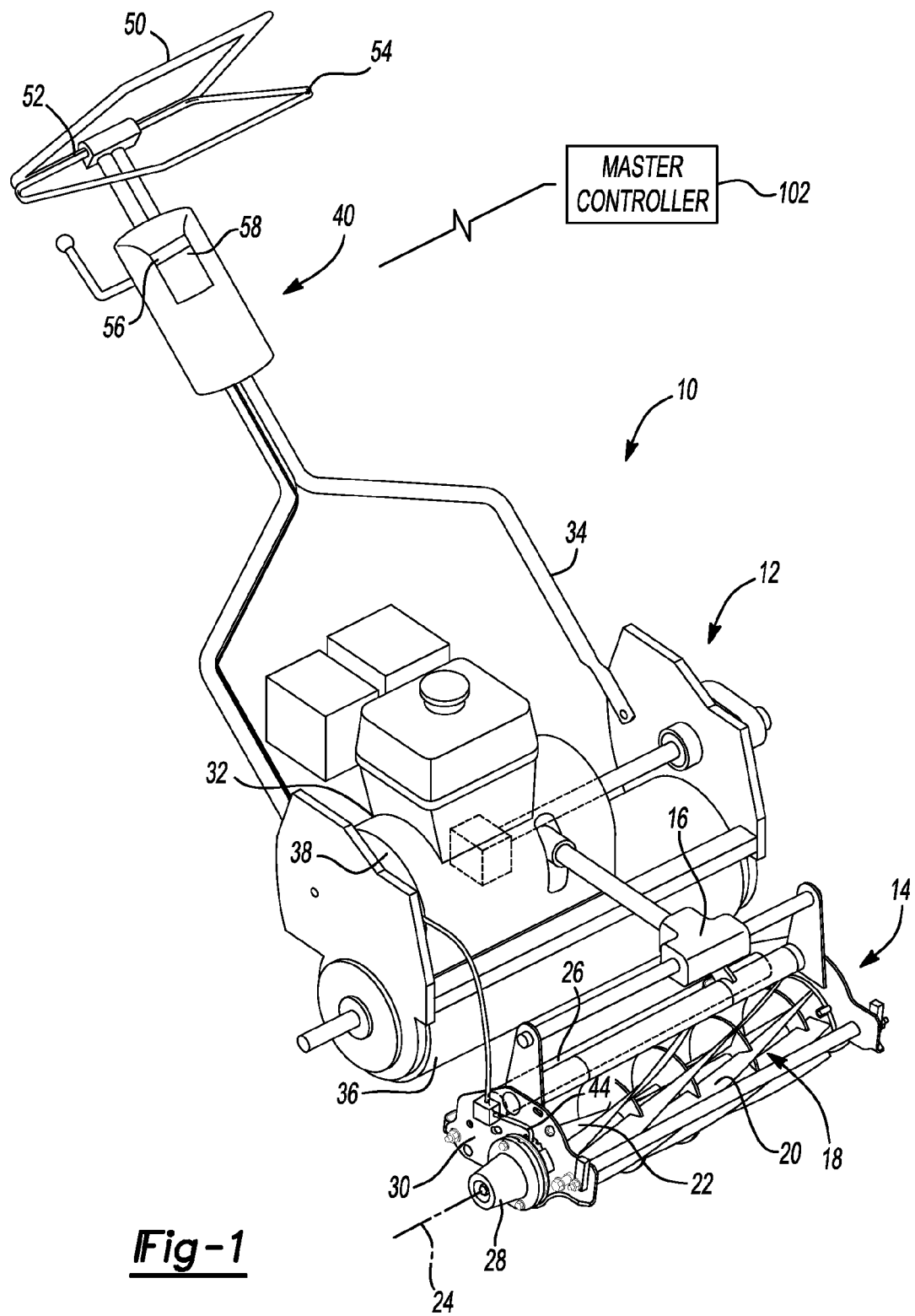
FIG. 1 is a perspective view illustrating a greens mower according to the principles of the present disclosure.

With reference to the figure, FIG. 1 illustrates a greens mower 10 incorporating the principles of the present disclosure. Greens mower 10 is a reel-type mower having a base portion 12 and a mowing unit 14. Mowing unit 14 may be articulately coupled to base portion 12 through a pivoting mechanism 16.

Mowing unit 14 includes a rotatable greens mower reel 18 having spiraled blades 20 equally spaced around a reel shaft 22. Reel shaft 22 is generally elongated and defines a rotation axis 24 extending along the length of reel shaft 22. A conventional fixed bed knife (not shown) is operably mounted to mowing unit 14. Blades 20 orbit relative to shaft 22 and move past the fixed bed knife for the usual and well-known function of cutting the grass. Mowing unit 14 further includes a pair of ground engaging rollers 26 rotatably mounted along a forward and rearward portion of mowing unit 14. The pair of ground engaging rollers 26 serve to support mowing unit 14 for movement on the ground. In various embodiments, the pair of ground engaging rollers 26 can be adjustable to define a cutting height.

Mowing unit 14 further includes a variable electric motor 28. Electric motor 28 is illustrated mounted to a side member 30 of mowing unit 14. Electric motor 28 is then operably coupled to reel 18 to rotatably drive reel 18 through a transmission system (not shown). The transmission system may include belts, gears, chains, or the like in a conventional fashion to transfer the drive force from electric motor 28 to reel 18. As should be appreciated, however, the transmission system extending between electric motor 28 and reel 18 is simple in construction, because it is directly mounted to mowing unit 14. Therefore, any articulation of mowing unit 14 does not affect the relative positional relationship of the drive motor 28 and the reel 18, as is common in prior art articulating greens mowers. Consequently, the transmission system need only include the necessary pieces to define a range of rotational speeds relative to the capacity of electric motor 28, such as a simple gear train.

Base portion 12 generally includes a motor 32, a frame 34, a lawn roller 36, a drive system 38, and a handle assembly 40. Handle assembly 40 includes a handle 50 suitably connected with frame 34. Handle 50 includes a grip portion 52 which the operator can hold in steering greens mower 10. A movably mounted bail or operator hand control 54 is pivotally connected to handle 50 and is movable toward and away from the grip portion 52. The operation of hand control 54 may be similar to that disclosed in commonly owned U.S. Pat. No. 6,523,334, which is incorporated herein by reference. In this arrangement, the operator can hold both handle 50 and hand control 54 while guiding greens mower 10. Upon release of hand control 54, traction drive system 38 is interrupted in a manner similar to that disclosed in the '334 Patent.

Additionally, the vicinity of handle 50 further includes a data display 56 mounted thereon, which are therefore presented to the user for observation or actuation. A mower controller 58 is mounted on handle assembly 40.

In various embodiments, the mower controller 58 can be a central processing unit capable of monitoring and controlling the various functions of greens mower 10. Additionally, in various implementations, the mower controller 58 can be operably coupled to data display 56 such that data display 56 provides a simple and intuitive user interface. Referring now to the schematic representation in FIG. 2, a control system 100 is shown having mower controller 58 and data display 56. As can be seen, data display 56 is operable to communicate with mower controller 58. Data display 56 is an LCD or LED device that serves as a user interface to provide the user with critical and informative data and further to provide a simple method of managing such data and controlling greens mower 10. To this end, data display 56 may be configured for display using multinational languages and units of measure.

Figure 2:
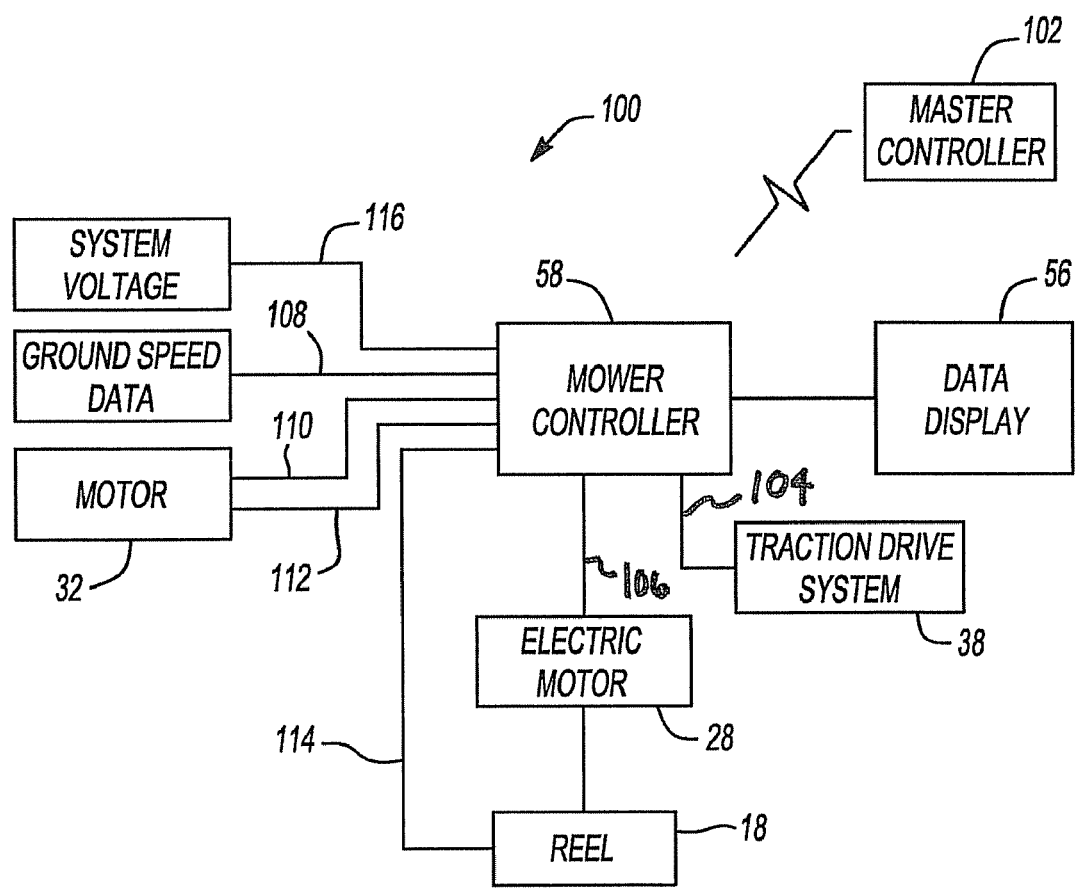
FIG. 2 is a schematic view illustrating the control system of the present disclosure.

With continued reference to FIG. 2, it can be seen that mower controller 58 serves as the primary processing unit and, thus, receives multiple inputs to in turn positively and actively control multiple outputs. Mower controller 58 is operable to control traction drive system 38 via a line 104. Additionally, mower controller 58 is operable to control electric motor 28 via a line 106. As described above, electric motor 28 directly controls the drive speed of reel 18. Thus, mower controller 58 is capable of controlling the speed of reel 18 (via electric motor 28) and the groundspeed of greens mower 10 (via traction drive system 38). Consequently, mower controller 58 can maintain a preselected clip rate, even if groundspeed or reel speed vary. That is, when the ground speed of greens mower 10 is reduced, mower controller 58 can reduce the speed of reel 18 and vice versa, thereby maintaining a desired clip rate.

Mower controller 58 further receives multiple inputs. For instance, mower controller 58 may receive groundspeed data via line 108. This groundspeed data may be gathered from either the drive speed of traction drive system 38 or a sensor (not shown) operably coupled to either lawn roller 36 or rollers 26. Additionally, mower controller 58 receives motor speed data from motor 32 at line 110, current draw (if applicable) data from motor 32 at line 112, speed data from reel 18 at line 114, and overall system voltage at line 116. This data may then be used to vary the operation of greens mower 10, such as by disengaging motor 28 upon detection of a current spike caused by a jam or during overload or overheating.

Mower controller 58 includes additional features that are useful for the accurate and reliable control of greens mower 10. Specifically, mower controller 58 and/or data display 56 can be capable of wireless or datalinked communication with a master controller 102. In various embodiments, the master controller 102 includes all of the control features of data display 56 and further includes additional administrator/supervisor controls. It is anticipated that a single master controller 102 may be used to program or control a plurality of greens mowers simultaneously to facilitate the rapid configuration of multiple greens mowers. However, it should be understood that these same administrator/supervisor control settings may be accessed via data display 56.

Administrator/supervisor control settings may include such features as a pre-set reel speeds, clip rates, and/or groundspeeds. Administrator/supervisor control settings are ideally not accessible by individual grounds workers. In the regard, mower controller 58 can then maintain a preselected clip rate set by an administrator or supervisor irrespective of the workers ground speed. Additional indicators or visual/audible alerts can be used to alert the worker when a supervisor setting can not be achieved. Mower controller 58 further limits the operation of greens mower 10 at a point prior to this stage when a supervisor setting is not achieved.

Finally, in various embodiments, the mower controller 58 can be provided with a non-volatile memory and powered by greens mower 10 and/or separate power source.

The description of the present disclosure is merely exemplary in nature and, thus, variations that do not depart from the gist of the present disclosure are intended to be within the scope of the disclosure. Such variations are not to be regarded as a departure from the spirit and scope of the disclosure.

What is claimed is:

1. A turf maintenance vehicle, said vehicle comprising:
   a traction drive system structured and operable to provide movement of the vehicle across a ground surface;
   an electric motor structured and operable to provide rotation of a cutting device including a plurality of cutting blades; and
   a vehicle controller configured to:
      receive a programmable vehicle clip rate data input;
      monitor a groundspeed of the vehicle as the vehicle moves across the ground surface;
      monitor a rotational speed of the cutting device as the vehicle moves across the ground surface; and
      actively control the electric motor based on the monitored vehicle groundspeed to actively control the rotational speed of the cutting device in order to maintain the programmed clip rate of the vehicle as the vehicle moves across the ground surface.

2. The vehicle of claim 1, wherein the controller is further configured to monitor a current provided to the electric motor and disengage the electric motor from the cutting device when the controller senses an increase in the current indicative of a jam or overloading of the cutting device.

3. The vehicle of claim 1, wherein the vehicle further comprises a data display communicatively coupled to the vehicle controller and operable to actively display at least one of the programmed clip rate, the vehicle ground speed, the cutting device rotational speed and the clip rate as the vehicle moves across the ground surface.

4. The vehicle of claim 3, wherein the data display is operable to actively display the at least one of the programmed clip rate, the vehicle ground speed, the cutting device rotational speed and the clip rate as the vehicle moves across the ground surface using multinational languages.

5. The vehicle of claim 3, wherein the data display is operable to actively display the at least one of the programmed clip rate, the vehicle ground speed, the cutting device rotational speed and the clip rate as the vehicle moves across the ground surface using multinational units of measure.

6. The vehicle of claim 3, wherein the data display is operable to actively display the at least one of the programmed clip rate, the vehicle ground speed, the cutting device rotational speed and the clip rate as the vehicle moves across the ground surface using at least one of multinational languages and units of measure.

7. The vehicle of claim 1, wherein the traction drive system is further structured and operable to provide a groundspeed signal to the vehicle controller indicative of the groundspeed of the vehicle as the vehicle moves across the ground surface.

8. The vehicle of claim 1, further comprising:
a lawn roller operably coupled to the traction drive system; and
a speed sensor operably coupled to the lawn roller and operable to provide a groundspeed signal to the vehicle controller indicative of the groundspeed of the vehicle as the vehicle moves across the ground surface.

9. The vehicle of claim 1, wherein the vehicle controller is connectable to a master controller to receive the vehicle clip rate data input from the master controller.

10. The vehicle of claim 1, wherein the vehicle controller is further configured to wirelessly communicate with a master controller to receive the vehicle clip rate data input from the master controller.

11. The vehicle of claim 1, wherein the vehicle controller is further configured to:
monitor at least one of a speed of a drive motor operably coupled to the traction drive system, a current draw of the electric motor and an overall system voltage as the vehicle moves across the ground surface; and
actively control the electric motor based on at least one of the monitored drive motor speed, the monitored electric motor current draw and the monitored overall system voltage to actively control the rotational speed of the cutting device in order to maintain the programmed clip rate of the vehicle as the vehicle moves across the ground surface.

12. The vehicle of claim 11, wherein the vehicle controller is further configured to actively control at least one of the electrical motor and the traction drive system, based on the monitored rotational speed of the cutting device as the vehicle moves across the ground surface and at least one of:
the monitored groundspeed of the vehicle as the vehicle moves across the ground surface;
the monitored drive motor speed as the vehicle moves across the ground surface;
the monitored electric motor current draw as the vehicle moves across the ground surface; and
the monitored overall system voltage as the vehicle moves across the ground surface,
to actively control the groundspeed of the vehicle in order to maintain the programmed clip rate of the vehicle as the vehicle moves across the ground surface.

13. A turf maintenance vehicle, said vehicle comprising:
a traction drive system structured and operable to provide movement of the vehicle across a ground surface;
an electric motor structured and operable to provide rotation of a cutting device including a plurality of cutting blades; and
a vehicle controller configured to:
wirelessly communicate with a master controller to receive a programmable vehicle clip rate data input;
monitor a groundspeed of the vehicle as the vehicle moves across the ground surface;
monitor a rotational speed of the cutting device as the vehicle moves across the ground surface; and
actively control the electric motor based on the monitored vehicle groundspeed to actively control the rotational speed of the cutting device in order to maintain the programmed clip rate of the vehicle as the vehicle moves across the ground surface.

14. The vehicle of claim 13, wherein the controller is further configured to monitor a current provided to the electric motor and disengage the electric motor from the cutting device when the controller senses an increase in the current indicative of a jam or overloading of the cutting device.

15. The vehicle of claim 13, wherein the vehicle further comprises a data display communicatively coupled to the vehicle controller and operable to actively display at least one of the programmed clip rate, the vehicle ground speed, the cutting device rotational speed and the clip rate as the vehicle moves across the ground surface.

16. The vehicle of claim 15, wherein the data display is operable to actively display the at least one of the programmed clip rate, the vehicle ground speed, the cutting device rotational speed and the clip rate as the vehicle moves across the ground surface using multinational languages.

17. The vehicle of claim 15, wherein the data display is operable to actively display the at least one of the programmed clip rate, the vehicle ground speed, the cutting device rotational speed and the clip rate as the vehicle moves across the ground surface using multinational units of measure.

18. The vehicle of claim 13, wherein the traction drive system is further structured and operable to provide a groundspeed signal to the vehicle controller indicative of the groundspeed of the vehicle as the vehicle moves across the ground surface.

19. The vehicle of claim 13, further comprising:
a lawn roller operably coupled to the traction drive system; and
a speed sensor operably coupled to the lawn roller and operable to provide a groundspeed signal to the vehicle controller indicative of the groundspeed of the vehicle as the vehicle moves across the ground surface.

20. The vehicle of claim 13, wherein the vehicle controller is connectable to the master controller to receive the vehicle clip rate data input from the master controller.

21. The vehicle of claim 13, wherein the vehicle controller is further configured to:
monitor at least one of a speed of a drive motor operably coupled to the traction drive system, a current draw of the electric motor and an overall system voltage as the vehicle moves across the ground surface; and
actively control the electric motor based on at least one of the monitored drive motor speed, the monitored electric motor current draw and the monitored overall system voltage to actively control the rotational speed of the cutting device in order to maintain the programmed clip rate of the vehicle as the vehicle moves across the ground surface.

22. The vehicle of claim 21, wherein the vehicle controller is further configured to actively control at least one of the drive motor and the traction drive system, based on the monitored rotational speed of the cutting device the vehicle moves across the ground surface and at least one of:
the monitored groundspeed of the vehicle as the vehicle moves across the ground surface;
the monitored drive motor speed as the vehicle moves across the ground surface;

the monitored electric motor current draw as the vehicle moves across the ground surface; and the monitored overall system voltage as the vehicle moves across the ground surface, to actively control the groundspeed of the vehicle in order to maintain the programmed clip rate of the vehicle as the vehicle moves across the ground surface.

23. A turf maintenance vehicle, said vehicle comprising:

a drive motor operably coupled to a traction drive system structured and operable to provide movement of the vehicle across a ground surface;

an electric motor structured and operable to provide rotation of a cutting device including a plurality of cutting blades; and a vehicle controller configured to:

receive a programmable vehicle clip rate data input;

monitor a speed of the drive motor as the vehicle moves across the ground surface;

monitor a groundspeed of the vehicle as the vehicle moves across the ground surface;

monitor a rotational speed of the cutting device as the vehicle moves across the ground surface; and actively control at least one of the electric motor and the traction drive system, based on the monitored rotational speed of the cutting device as the vehicle moves across the ground surface and at least one of the monitored groundspeed and the monitored drive motor speed to actively control the groundspeed of the vehicle in order to maintain the programmed clip rate of the vehicle as the vehicle moves across the ground surface.

24. The vehicle of claim 23, wherein the controller is further configured to monitor a current provided to the electric motor and disengage the electric motor from the cutting device when the controller senses an increase in the current indicative of a jam or overloading of the cutting device.

25. The vehicle of claim 23, wherein the vehicle further comprises a data display communicatively coupled to the vehicle controller and operable to actively display at least one of the programmed clip rate, the vehicle ground speed, the cutting device rotational speed and the clip rate as the vehicle moves across the ground surface.

26. The vehicle of claim 23, wherein the traction drive system is further structured and operable to provide a groundspeed signal to the vehicle controller indicative of the groundspeed of the vehicle as the vehicle moves across the ground surface.

27. The vehicle of claim 23, further comprising:

a lawn roller operably coupled to the traction drive system; and a speed sensor operably coupled to the lawn roller and operable to provide a groundspeed signal to the vehicle controller indicative of the groundspeed of the vehicle as the vehicle moves across the ground surface.

28. The vehicle of claim 23, wherein the vehicle controller is further configured to wirelessly communicate with a master controller to receive the vehicle clip rate data input from the master controller.

29. The vehicle of claim 23, wherein the vehicle controller is further configured to:

monitor at least one of a current draw of the electric motor and an overall system voltage as the vehicle moves across the ground surface; and actively control the at least one of the drive motor and the traction drive system based on the monitored rotational speed of the cutting device as the vehicle moves across the ground surface and at least one of the monitored electric motor current draw and the monitored overall system voltage to actively control the groundspeed of the vehicle in order to maintain the programmed clip rate of the vehicle as the vehicle moves across the ground surface.

30. The vehicle of claim 29, wherein the vehicle controller is further configured to actively control the electric motor based at least one of:

the monitored groundspeed of the vehicle as the vehicle moves across the ground surface;

the monitored drive motor speed as the vehicle moves across the ground surface;

the monitored electric motor current draw as the vehicle moves across the ground surface; and the monitored overall system voltage as the vehicle moves across the ground surface, to actively control the rotational speed of the cutting device in order to maintain the programmed clip rate of the vehicle as the vehicle moves across the ground surface.

* * * * *